United States Patent
Hirth et al.

[19]

[11] Patent Number: 6,118,815
[45] Date of Patent: Sep. 12, 2000

[54] ADAPTING EQUALIZATION GAIN AND OFFSET FOR DATA TRANSMISSIONS

[75] Inventors: Ryan E. Hirth, Cupertino; Ruchi Wadhawan, Sunnyvale, both of Calif.; Robert H. Leonowich, Temple; Ayal Shoval, Whitehall, both of Pa.; Kathleen O. Lee, Brookline, Mass.

[73] Assignee: 3Com Corporation, Santa Clara, Calif.

[21] Appl. No.: 08/994,862

[22] Filed: Dec. 19, 1997

[51] Int. Cl.[7] .................................................. H04L 27/01
[52] U.S. Cl. .......................... 375/232; 375/345; 708/323
[58] Field of Search .................................... 375/224, 229, 375/230, 232, 345, 350; 708/322, 323; 333/17.2, 18, 28 R; 360/65, 67

[56] References Cited

U.S. PATENT DOCUMENTS

| | | | |
|---|---|---|---|
| 5,467,370 | 11/1995 | Yamasaki et al. | 375/232 |
| 5,721,756 | 2/1998 | Liebetreu et al. | 375/344 |
| 5,880,645 | 3/1999 | Everitt et al. | 333/18 |
| 5,940,441 | 8/1999 | Crandford et al. | 375/232 |

*Primary Examiner*—Amanda T. Le
*Attorney, Agent, or Firm*—Wilson, Sonsini, Goodrich & Rosati

[57] ABSTRACT

A method for tuning an adaptive equalizer in order to receive digital signals from a transmission medium both coarse and fine tuning methods to adaptively equalize a signal received from the transmission medium. The coarse tuning method adjusts an equalizer such that the post equalized signal starts to resemble a known data pattern, such as an MLT3 data pattern. The coarse tuning method monitors and corrects for several things: illegal transitions, over equalization, statistical data pattern anomalies and saturation conditions. Fine tuning methods operate concurrently with the coarse tuning methods and function from the point at which the coarse tuning methods stop being efficient. Additionally, the fine tuning methods hold the waveform locked in. In addition to coarse tuning and fine tuning of the equalizer, the present invention also adjusts gain of the overall signal such that the post equalized signal is always a certain amplitude. It also corrects for offsets that may get superimposed on the signal as it passes through the receive channel and which may lead to erroneous bit decisions. The method is applicable to a variety of data communication standards including 100 Base-X, FDDI and ATM-155.

26 Claims, 14 Drawing Sheets

ADAPTING EQUALIZATION GAIN AND OFFSET FOR DATA TRANSMISSIONS

RELATED APPLICATIONS

This application is related to non-provisional application, entitled "Detecting Valid Data Patterns for Adapting Equalization Gain and Offset for Data Transmissions," by inventors, Ryan Hirth and Ruchi Wadhawan, having Ser. No. 08/912,896, and filing date Aug. 15, 1997, which was filed on the same day as the instant application, now abandoned; and to non-provisional application, entitled "Detecting Overequalization for Adapting Equalization and Offset for Data Transmissions," by inventors, Ryan Hirth and Ruchi Wadhawan having Ser. No. 08/994,519, and filing date Dec. 19, 1997, which was filed on the same day as the instant application, now pending.

BACKGROUND OF THE INVENTION

1. Field of the Invention

The present invention relates to systems for transmitting data across a communication channel, and more particularly to a method and an apparatus for adaptively equalizing a signal flowing through a communication channel to compensate for transmission characteristics of the communication channel.

2. Description of Related Art

In digital data transmission systems, data in digital form is transmitted over media, such as wires or fiber optic cables, from a transmitter to a receiver. The digital data waveform is distorted with respect to instantaneous frequency and amplitude as it propagates along the transmission media due to electrical noise, dispersion and the unique frequency response of the transmission medium. Electrical noise refers to the unwanted components of an electrical signal that tend to disturb accurate transmission and processing of the signal. Dispersion refers to pulse spreading of the signal, and is measured in units of distance per time of travel.

Receivers in a digital data transmission system ideally regenerate the transmitted pulse train to its original form, without error. In digital receivers, this reconstruction is typically achieved by sampling the pulse train at a regular frequency, and at each sample instant making a decision as to the most probable symbol being transmitted. Typically, a threshold level is chosen to which the received signal is compared. Above this threshold level, a binary one is registered and below the threshold level a binary zero is registered. Errors may occur in the analog to digital conversion process due to various noises and disturbances. The noise sources can be either external to the system, for example, atmospheric noise or equipment generated noise, or internal to the system. Internal noise is present in every communications system and represents a basic limitation on the transmission and detection of signals.

The amplitude of the received signal may be degraded to the point where the signal to noise ratio at the decision instant may be insufficient for accurate decisions to be made consistently. For instance, with high noise levels, the binary zero may occur above the threshold and hence be registered as a binary one. Moreover, the actual received data transmissions may be displaced in time from the true transmission. This displacement, or intersymbol interference, of the transition is caused by a new pulse arising at the receiver before the previous pulse has died down. Intersymbol interference occurs due to pulse spreading caused by the dispersion of the transmission media. Variations in the clock rate and phase degradations also distort the zero crossings resulting in decision time misalignment. When a pulse is transmitted in a given timeslot, most of the pulse energy will arrive in the corresponding timeslot at the receiver. However, because of pulse spreading induced by the transmission medium, some of the pulse energy will progressively spread into adjacent timeslots, resulting in an interfering signal. The effect of pulse spreading may be reduced by equalization, which provides a frequency dependent gain and phase delay to force the transmitted binary one to be followed by zero at all neighboring decision times to confine as much of the pulse energy as possible to the timeslot to which it corresponds. The purpose of equalization, then, is to mitigate the effects of signal degradation and intersymbol interference. The equalizer thus optimizes the signal at the decision instant so that the bit error rate of the system may be minimized. Equalizers are basically filters with frequency and phase responses that are typically inverse of that of the transmission medium.

Adaptive equalization involves adjusting the transfer function or frequency response of the equalizing filter continuously during data transmission. Some of the known adaptive equalization methods include switching capacitor techniques and digital signal processing techniques. Both of these methods require digital signal sampling at least two times the Nyquist rate or as much as between eight and twelve times the transmitted data rate. Such a high sampling rate makes these methods difficult to apply in high speed applications. They also require large amounts of circuitry, which translates into higher power consumption.

These equalizing filters used for adaptive equalization have a range of settings corresponding to various lengths of transmission medium. The receiver needs to figure out correctly and accurately the channel characteristics on the transmission medium the signal has been through so that it can chose the appropriate filter setting to undo the effect of the transmission medium. This process is called tuning or "adapting" the equalizer.

Furthermore, existing adaptive equalization systems often reach metastable states, and do not converge to the optimal equalization and amplification settings. Additionally, existing high speed adaptive equalization systems are implemented in expensive bipolar technology, and not inexpensive CMOS technology or by combinations of digital signal processors DSP with specialized CMOS logic.

Some digital data transmissions use a ternary coding scheme known as MLT3. MLT3 uses three signal values: 1, 0 and −1, and ensures that groups of ones that are separated by zeros will always alternate in polarity. In other words, data patterns such as 1, 1, 1, 0, 0, 0, 1, 1, 1 and −1, −1, −1, 0, 0, 0, −1, −1, −1 are illegal because the ones do not alternate in polarity.

What is needed is a system for adaptively equalizing a digital data transmission which rapidly converges to optimal equalization and amplification settings without getting caught in a metastable state. Additionally, what is needed is an adaptive equalization system which can be implemented in CMOS technology, with minimum power, area and complexity.

SUMMARY OF THE INVENTION

The present invention provides a method and an apparatus for tuning an adaptive equalizer in order to receive digital signals from a transmission medium. The present invention uses both coarse and fine tuning methods to adaptively equalize a signal received from the transmission medium.

The coarse tuning method adjusts an equalizer such that the post equalized signal starts to resemble a known data pattern, such as an MLT3 data pattern. The coarse tuning method monitors and corrects for several things: illegal code sequences, over equalization, statistical data pattern anomalies and saturation conditions.

Fine tuning methods operate concurrently with the coarse tuning methods and function to improve channel performance by reducing intersymbol interference, and otherwise, from the point at which the coarse tuning methods stop being efficient. Additionally, the fine tuning methods hold the waveform locked in, irrespective of base line wander events.

In addition to coarse tuning and fine tuning of the equalizer, the present invention also adjusts gain of the overall signal such that the post equalized signal is always a certain amplitude. It also corrects for offsets that may get superimposed on the signal as it passes through the receive channel and which may lead to erroneous bit decisions. The present invention is applicable to a variety of networking standards including, 100 Base-X, FDDI and ATM-155.

Thus, one aspect of the present invention can be characterized as a method for detecting over equalization of a signal. Over equalization implies that the equalizer is trying to correct for a length of transmission medium longer than what the signal has actually been through for example by having too much gain at higher frequencies. The method operates by measuring the duration of zero values on the signal, and if the duration of these zero values is less than a minimum interval, an over equalization condition exists on the signal. One embodiment includes adjusting an equalization amount or equalizer setting for the signal when an over equalization condition is indicated.

One aspect of the present invention can be characterized as a method for detecting illegal code sequences in a signal. This method operates by monitoring the signal, and indicating an illegal code sequence if the signal makes a transition from a positive one value to a zero value and back to a positive one value. An illegal code sequence is also indicated if the signal makes the transition from a negative one value to a zero value back to a negative one value. The occurrence of such events in the post equalized waveform is used to gather information for tuning.

One aspect of the present invention can also be characterized as a method of detecting the fact that valid data patterns are occurring in the signal. The method operates by determining a measurement period with a timer. During the measurement period, the method monitors the signal for a first number of consecutive one values, as well as monitoring the signal for a second number of consecutive zero values. If the first number of one values and the second number of zero values are detected during the measurement period, the method indicates that valid data patterns occurred during the measurement period. The measurement period is adequately long such that statistically the probability of detecting these data patterns is adequately high. Nonoccurrence of these data patterns is used as information for making tuning decisions.

The present invention can also be characterized as a method for adaptively equalizing a signal. The method operates in a system including an automatic gain control, which maintains a level of gain across a frequency spectrum. It also includes an equalizer, which adjusts a filter at a particular frequency. A tuning mechanism is coupled to the automatic gain control and the equalizer, and it adaptively adjusts the level of gain in the automatic gain control and the equalizer filter. The method operates by monitoring the automatic gain control, and if the automatic gain control reaches a maximum value and the tuning mechanism indicates more gain is required, an equalizer parameter is increased to achieve the additional gain. This is tuning by using a saturation method.

According to another aspect of the present invention can be characterized as a method for adaptively equalizing a signal. The method operates in a system including an automatic gain control, which adjusts a gain across an entire frequency spectrum. It also includes an offset, that applies an offset voltage across the entire frequency spectrum, as well as a tuning mechanism that adaptively adjusts the automatic gain control and the offset. The method operates by monitoring the offset and the tuning mechanism. If the offset reaches a maximum value and the tuning mechanism indicates that more offset is required, the automatic gain control is adjusted to substitute for the additional offset.

One aspect of the present invention can also be characterized as a method for adaptively equalizing a signal. The method operates by gathering a first sample after a first time interval following a transition in the signal, and gathering a second sample after a second time interval following the transition in the signal. Next, the method determines if the signal is overdamped from the first and second samples. If the signal is overdamped, the system adjusts an equalizer setting to cause the equalization effect to compensate for increased wire length, for example. The system also determines if the signal is underdamped from the first and second samples. If the signal is underdamped, the equalizer parameter is adjusted for example to cause the equalization effect to compensate for a decreased wire length.

Another aspect of the present invention can be characterized as a method for adaptively tuning the gain of a signal. The method operates by gathering samples a given time interval after certain transitions in the signal. The method decreases an automatic gain setting if samples gathered after transitions to a positive one are generally above a positive one value and samples gathered after transitions to a negative one value are generally below the negative one value. The method increases the automatic gain if samples gathered after transitions to a positive one value are generally below the positive one value and samples gathered after transitions to a negative one value are generally above (less negative than) the negative one value.

One aspect of the present invention can be characterized as a method for adaptively tuning out offsets in a signal. Offsets may be contributed by the receive channel and are an impediment to accurate bit decisions. The method operates by gathering a plurality of samples a fixed time interval after transitions in the signal. The method decreases channel offset if samples gathered after transitions to a positive one value are generally above the positive one value and samples gathered after transitions to a negative one value are generally above the negative one value. The method increases the offset if samples gathered after transitions to a positive one value are generally below the positive one value and samples gathered after transitions to a negative one value are generally below the negative one value. Another aspect of the present invention can be characterized as a method for adaptively tuning out offsets in a signal. The method operates by gathering a plurality of samples a fixed time interval after transitions in the signal. The method decreases offset if samples in the plurality of samples gathered after transitions to a zero value are generally above the zero value. The method increases the offset if samples in the plurality of samples gathered after transitions to a zero value are generally below the zero value.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
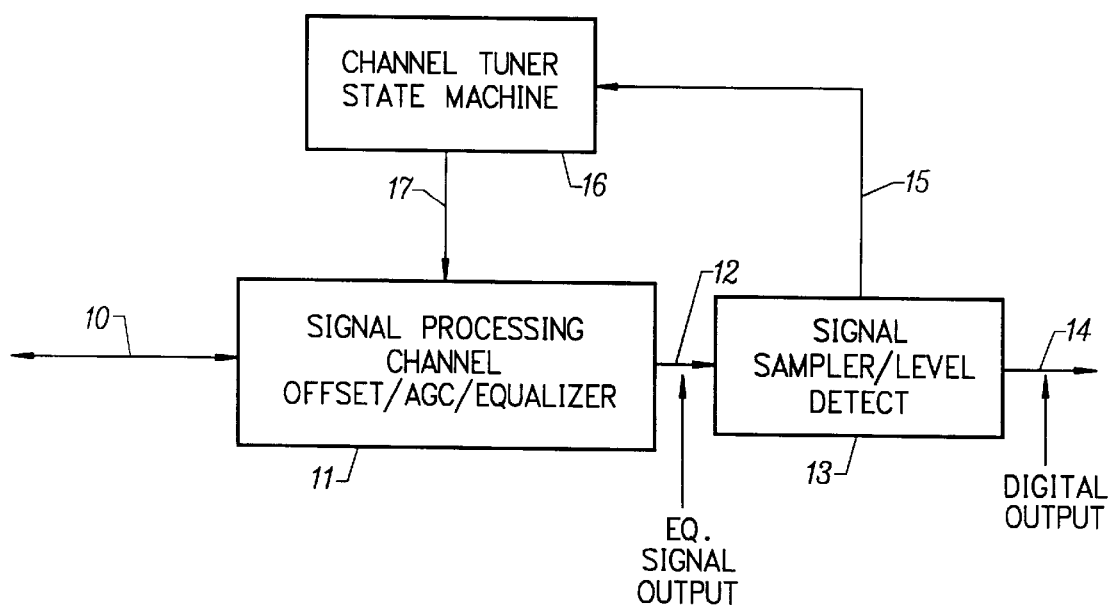
FIG. 1 is a simplified diagram illustrating a signal processing channel with tuning mechanisms according to the present invention.

FIG. 1 is a simplified diagram of a signal processing channel including channel offset, automatic gain control (AGC) and equalizing functions such as used according to the present invention for high speed communication channel. Thus an input signal requiring equalization is received on line 10 from a communication medium. The input signal is applied to a signal processing channel 11 that includes offset adjustment, automatic gain control functions, and equalizer functions. The output of the signal processing channel is applied on line 12 to a signal sampler and level detect circuit 13 which translates the equalized analog signal on line 12 into sampled output on line 14. In this example, the analog signal on line 12 encodes data in a three level MLT3 data pattern.

The system according to the present invention also includes a feedback path which includes a connection on line 15 to a channel tuner state machine 16. The channel tuner state machine 16 responds to the signal sampler and level detect circuit 13 to provide control signals on line 17 for adjustment of the offset, automatic gain control circuit, and equalizer functions of the signal processing channel 11.

Figure 2:
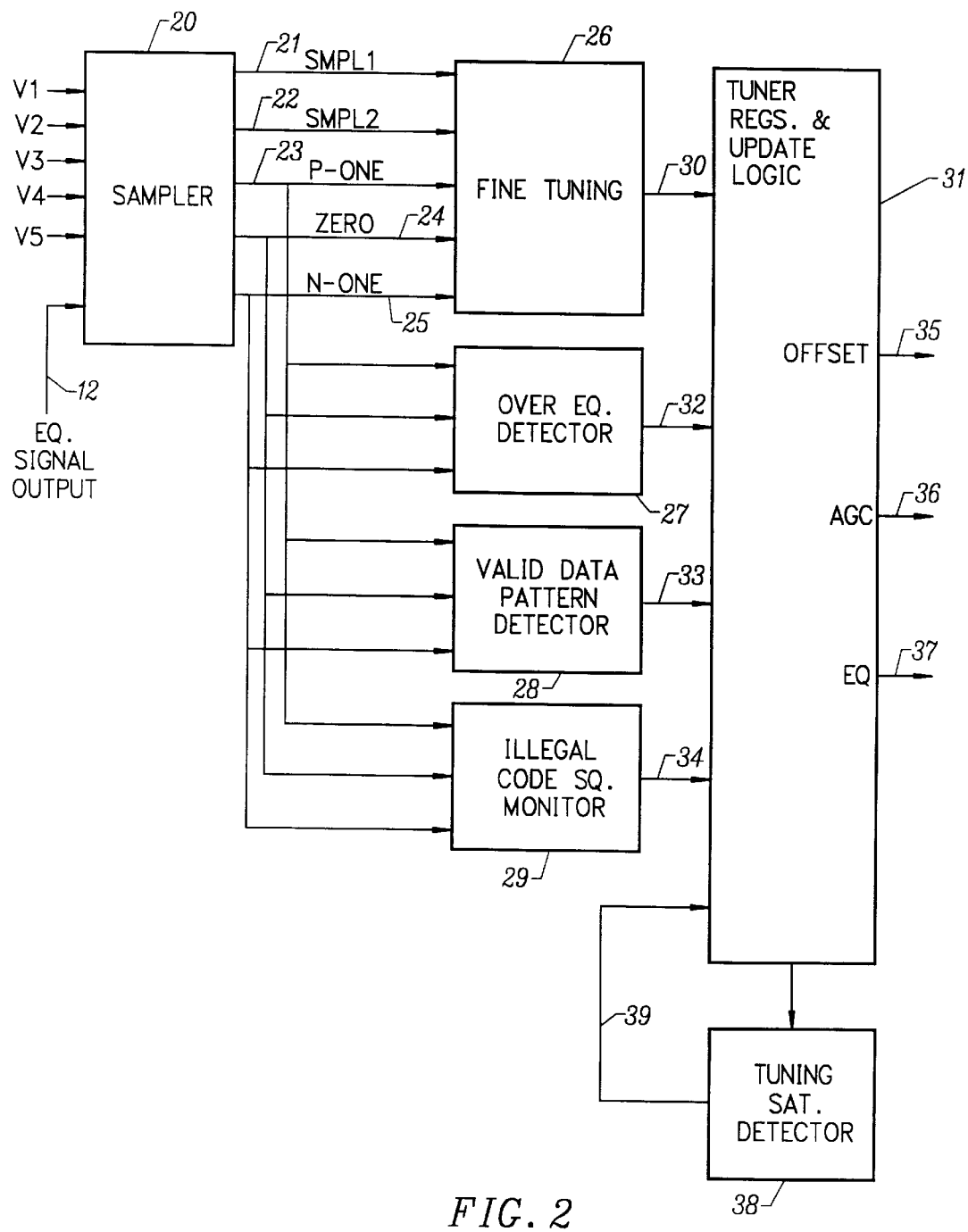
FIG. 2 is a block diagram of the channel tuner state machine and sampling circuitry used in the system of FIG. 1 according to the present invention.

FIG. 2 is a block diagram of the channel tuner state machine and sampler according to the present invention. The sampler 20 (corresponding to block 13 of FIG. 1) receives the equalizer signal output from line 14 of FIG. 1, as well as reference voltages V1, V2, V3, V4 and V5 for the MLT3 signal code. The reference voltages V1–V5 include a high positive threshold such as about 1.0 volts, an intermediate positive threshold such as about 0.5 volts, a ground reference voltage, a negative intermediate reference voltage such as about −0.5 volts, and a negative high reference voltage such as about −1.0 volts. The sampler 20 includes comparators which compare the channel output signal on line 12 with the reference voltages. Sampler 20 operates to detect a transition in the signal on line 12 and upon detection of a transition generates a first sample signal on line 21 a first time interval of less than one bit time, such as about 4 nanoseconds after the transition in a 125 MHz MLT3 signal, and a second sample signal on line 22 at a time interval thereafter of about 1 bit period, such as about 8 nanoseconds. Also, the sampler generates an output for each bit period indicating whether the sample signal represents a positive 1 on line 23, a zero on line 24, and a negative 1 on line 25.

The five signals on lines 21–25 are supplied to a fine tuning circuitry 26. The signals on lines 23–25 are supplied to an overequalization detector 27, a valid data pattern detector 28, and an illegal code sequence monitor 29 used for coarse tuning.

The output of the fine tuning circuit is applied on line 30 to tuner registers and update logic 31. The outputs of the overequalization detector 27 are applied on line 32 to the tuner registers and update logic 31. The output of the valid data pattern detector 28 is applied on line 33 to the tuner registers and update logic 31. The output of the illegal code sequence monitor 29 is applied on line 34 to the tuner registers and update logic 31. The system also includes a tuning saturation detector 38 which monitors the offset, AGC and equalizer parameters to detect saturation, and applies a control signal on line 39 to the tuner registers and update logic 31. The tuner registers and update logic 31 apply control signals for adjusting the offset of the signal processing channel on line 35, for adjusting the automatic gain control on line 36, and for adjusting the equalizer on line 37 to the signal processing channel 11.

The tuner registers and update logic 31 operate to adjust parameters associated with automatic gain control, offset and equalization for an adjustable data channel. Increasing the automatic gain control parameter results in an increase in the level of gain. Decreasing the automatic gain control parameter results in a decrease in the level of gain. The offset of the channel refers to a DC level of the output. Increasing and decreasing the offset parameter results in increasing and decreasing, respectively, an amount of DC signal applied to the channel to adjust the offset to a preferred level— typically zero offset. The equalization function operates to compensate for distortion in the input signal which varies over the frequency range of the data channel. For example, a signal which traverses a longer cable length typically suffers more degradation at higher frequencies than at lower frequencies. Thus, in this application, an increase in the equalization parameter results in an increase in the compensation to handle the greater signal degradation caused by longer cable lengths, for example by increasing the gain of the channel at higher frequencies. Likewise, decreasing the equalization parameter results in a decrease in compensation, for example by reducing the gain at higher frequencies.

The automatic gain control, offset adjustment and equalizer in the data channel can be implemented using techniques known in the art, including analog implementations in which the parameters are used to affect analog components in the channel, digital signal processing implementations, in which the parameters are used as arguments in the channel processing algorithms, and combinations of analog and digital implementations.

Tuning Methods

The present invention uses both coarse and fine tuning methods. The coarse methods are meant to allow the tuner to converge over all initial settings in a rapid manner. Coarse tuning adjusts the equalizer so that the output starts to resemble MLT3 data patterns. Coarse tuning operates by using an illegal code sequence monitor 29, an over equalized detector 27, a data pattern recognition monitor 28, and a saturation condition monitor 38. The illegal code sequence monitor 29 looks for 1 0 1, or −1 0 −1 transitions characteristic of high offsets. The over equalized detector 27 looks for fast rise and fall times, a characteristic of high equalization. The data pattern recognition monitor 28 uses a "watch dog" timer, and verifies that valid waveforms for tuning are being received during expected intervals. This prevents the tuner from getting stuck in a metastable condition. The saturation condition monitor 38 detects when one of the settings reaches its maximum or minimum value and the tuner is still trying to increment or decrement the setting, respectively.

The illegal code sequence monitor 29, over equalized detector 27, and saturation condition monitor 38 run continuously. However, once the system is in fine tune mode, these events will not occur. Data pattern recognition 28 is disabled after the first 330 microseconds for this embodiment because it operates statistically, and certain data patterns that it looks for may not occur during normal operation. For example, in unscrambled mode, certain data patterns are absent during inter-packet gaps. To prevent instability due to spurious triggering of the data pattern recognition tuner and also to enable operation in unscrambled mode, the data pattern recognition is switched off after the first 330 microseconds. Of course, the watchdog interval is adjusted to match the particular use of the invention.

Fine tuning 26 runs continuously, even during coarse tuning. The fine tuning methods minimize ISI to maintain an optimum output waveform when the coarse tuning methods stop working. The fine tuning methods additionally hold the waveform tuned in during system operation.

Coarse Tune Methods

Over Equalized Detector

Over equalized waveforms have fast rise and fall times, which cause the zeros in 1, 0, −1 or −1, 0, 1 transition sequences to have a short time durations at zero. The nominal duration for a typical zero in an MLT3 signal for 100 Base-X and FDDI is one baud time, or 8 nS±jitter at 125 MHz. If the duration of a zero drops to less than 4 nS, then the waveform is over equalized. See FIG. 13.

In one embodiment, the over equalized detector operates by sampling the output comparators in the sampling circuits on both the rising and falling edges of the 125 MHz clock. A counter increments every time the intermediate zero value is less than 4 nS in this example and the waveform transitions from a positive one to a negative one, or vice-versa. If the counter reaches eight, then the equalizer is decremented (adjusted to compensate for a shorter communication medium, or a medium which introduces less distortion and thus requires "less" equalization) and the counter is reset to gather fresh data.

Figure 3:
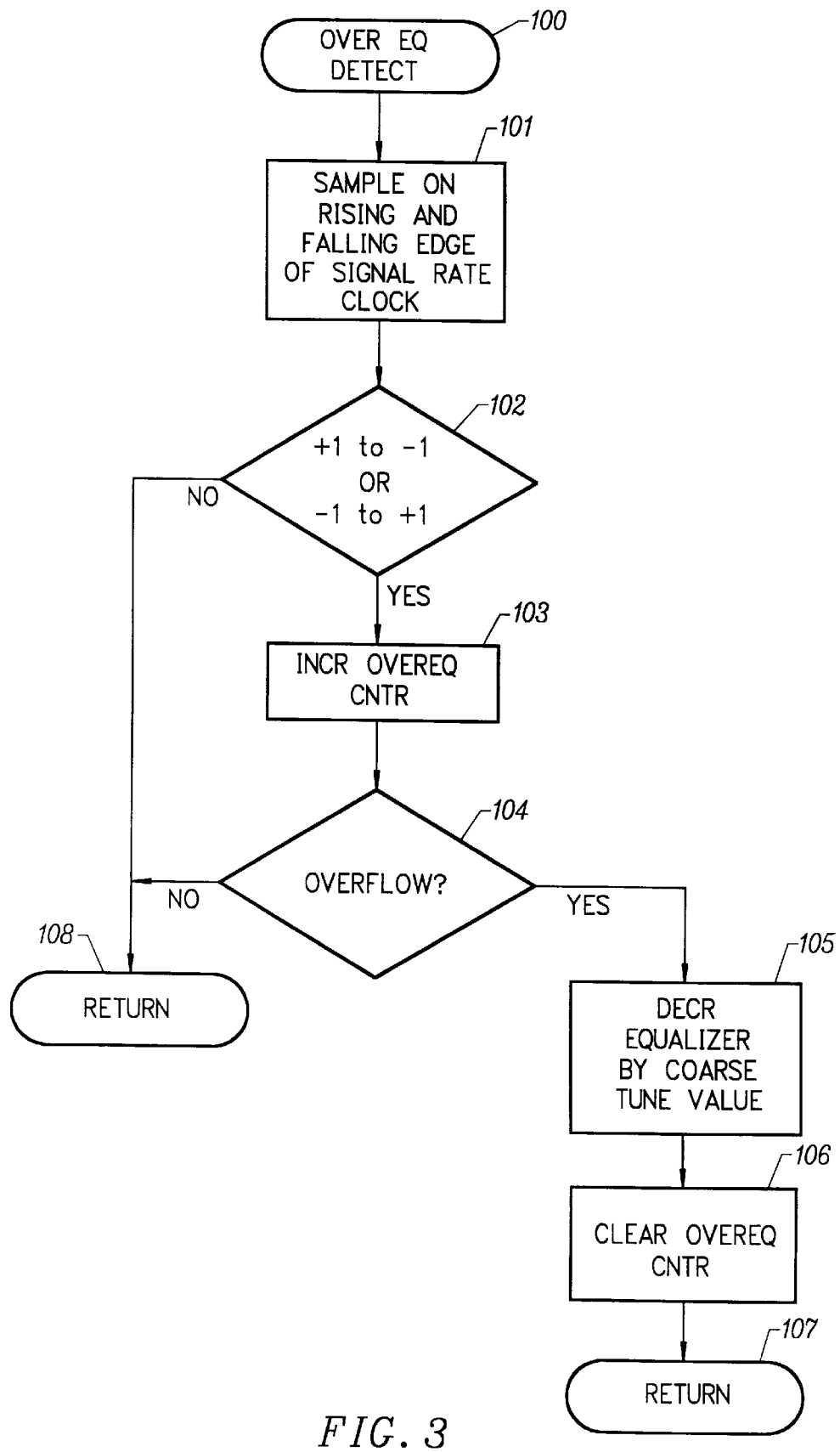
FIG. 3 is a flow chart illustrating the overequalization detector function executed by the tuner of the present invention.

FIG. 3 illustrates one example of the overequalization detector function. Thus the process begins at block 100. The process involves sampling the signal on the rising and falling edge of a signal rate clock 101 (i.e. every 4 nS for 125 MHz clock). The overequalization detector looks for transitions from +1 to −1 or from −1 to +1 without intervening zeros as indicated at block 102. If such transition occurs, then the overequalization counter is incremented (compensate for greater medium length or for greater distortion introduced by the medium) (block 103). If the overequalization counter overflows as indicated at block 104, then the equalizer value is decremented by a coarse tune value (block 105). Next, the overequalization counter is cleared (block 106), and the process returns (block 107). If at block 102, an illegal transition is not detected, or if at block 104, no overflow is detected, then the process returns to continue monitoring for illegal transitions (block 108).

Illegal Code Sequence Monitor

In one embodiment, a high offset condition is detected by looking for illegal code sequences, such as 1,0,1 or −1,0,−1. If a number, for example eight, of these events occur consecutively, the offset is decremented or incremented, respectively. See FIG. 11.

Figure 4:
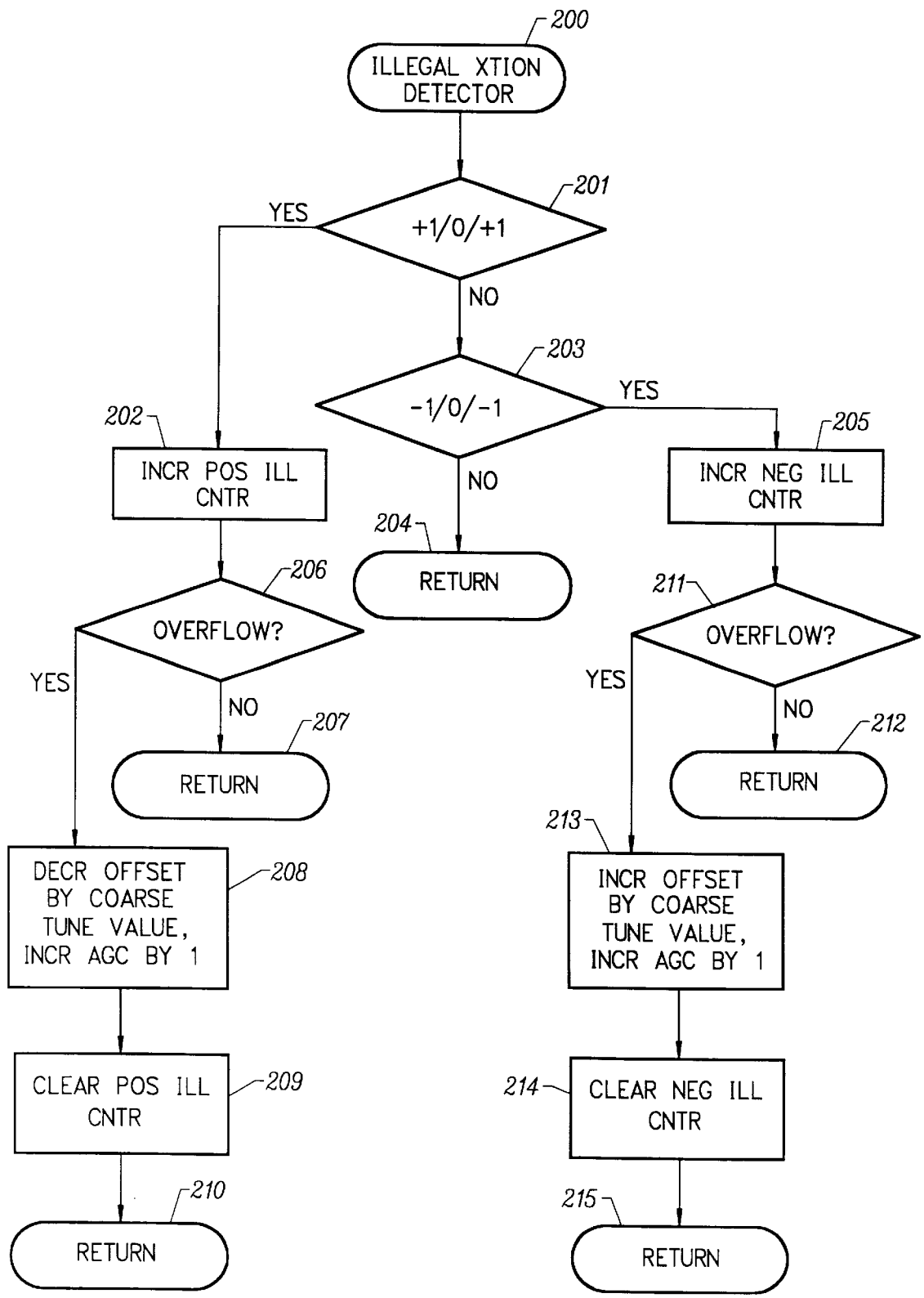
FIG. 4 is a flow chart of the illegal transition detector function of the tuner of the present invention.

FIG. 4 illustrates a block diagram of the illegal code sequence detector beginning at block 200. The process first looks for a sequence of events that transition from +1 to 0 back to +1 at block 201. If such illegal transition occurs, then a positive illegal transition counter is incremented (block 202). If such code sequences are not detected, then the process determines whether a −1, 0, −1 illegal code sequence is detected at block 203. If neither of these illegal code sequences are detected, then the process returns (block 204) to continue monitoring for illegal code sequences. If the −1, 0, −1 code sequence was detected at block 203, then a negative illegal code sequence counter is incremented (block 205).

Returning to block 202, after incrementing of the positive illegal code sequence counter, the process determines whether there has been a counter overflow (block 206). If not, then the algorithm returns to continue monitoring for illegal code sequences (block 207). If an overflow is detected, such as eight illegal code sequences, then the algorithm decrements the offset value by a coarse tune value, and increments the automatic gain control parameter by a fine tune value (block 208). After adjusting the parameters, the positive illegal code sequence counter is cleared (block 209) and the algorithm returns to continue monitoring for illegal code sequences.

Returning to block 205, after incrementing the negative illegal code sequence counter the process determines whether an overflow is detected (block 211). If not the process returns (block 212). If the overflow is detected, then the offset is incremented by a coarse tune value and the automatic gain control is incremented by one (block 213). Next the negative illegal code sequence counter is cleared (block 214). Finally the algorithm returns to continue monitoring (block 215).

Valid Pattern "Watch Dog"

The purpose of a valid pattern counter is to ensure that valid data patterns are occurring on a regular basis. In one embodiment, valid data patterns are defined to be three or more consecutive 1's, 0's, or −1's. Fine tune samples are taken on valid data patterns only. A "regular basis" is a statistically determined amount of time in which valid data patterns should have occurred. Valid patterns are guaranteed to occur during scrambled idles. However, they are not guaranteed to occur in packets, and they do not happen during unscrambled idles. For this reason, the valid counter only operates for the first 330 microseconds after signal detect (See, IEEE 802.3u specification) has been asserted. If valid data patterns are occurring then, fine tune will bring the waveform into convergence. Otherwise, one of the following conditions exist: no-edge, no-valid-zero, or no-valid-one.

To determine if valid data patterns are occurring in a MLT3 signal, flags are set when a valid positive one, a valid zero, or a valid negative one occurs. If all three of these flags are not set by the time a timer expires, then one or more valid patterns are deemed to have failed to occur, and one of the following actions will be taken.

If the timer expires and no valid flags are set, no edges are occurring. In this instance, the signal is sampled to see if the waveform is above the 0 to 1 comparator threshold (e.g. +0.5v), below the 0 to −1 threshold (e.g. −0.5v), or in between. In the event that the signal is above the 0 to 1 threshold, for example the offset is lowered by 4 relative settings and AGC is increased by 1 setting. If the signal is below the 0 to −1 threshold, the offset is increased by 4 relative settings and the AGC is increased by one relative setting. If the signal is in between, then the gain is increased by increasing the equalizer by six relative settings and the AGC by four relative settings.

If the timer expires and valid positive ones and valid negative ones flags are set, but the valid zero flag is not set, the waveform is experiencing too much gain and/or offset. For this case, AGC is lowered by one relative setting, and the offset is not changed since there is no way to determine which direction to adjust it. By lowering AGC only, either illegal code sequences will start occurring or fine tuning will begin, thereby allowing the waveform to converge.

If the timer expires and either the valid positive one flag or the valid negative one flag did not get set, the offset is adjusted. If no valid negative ones occurred, then the offset is lowered. If no valid positive ones occurred, then the offset is increased. See FIG. 14.

Figure 5:
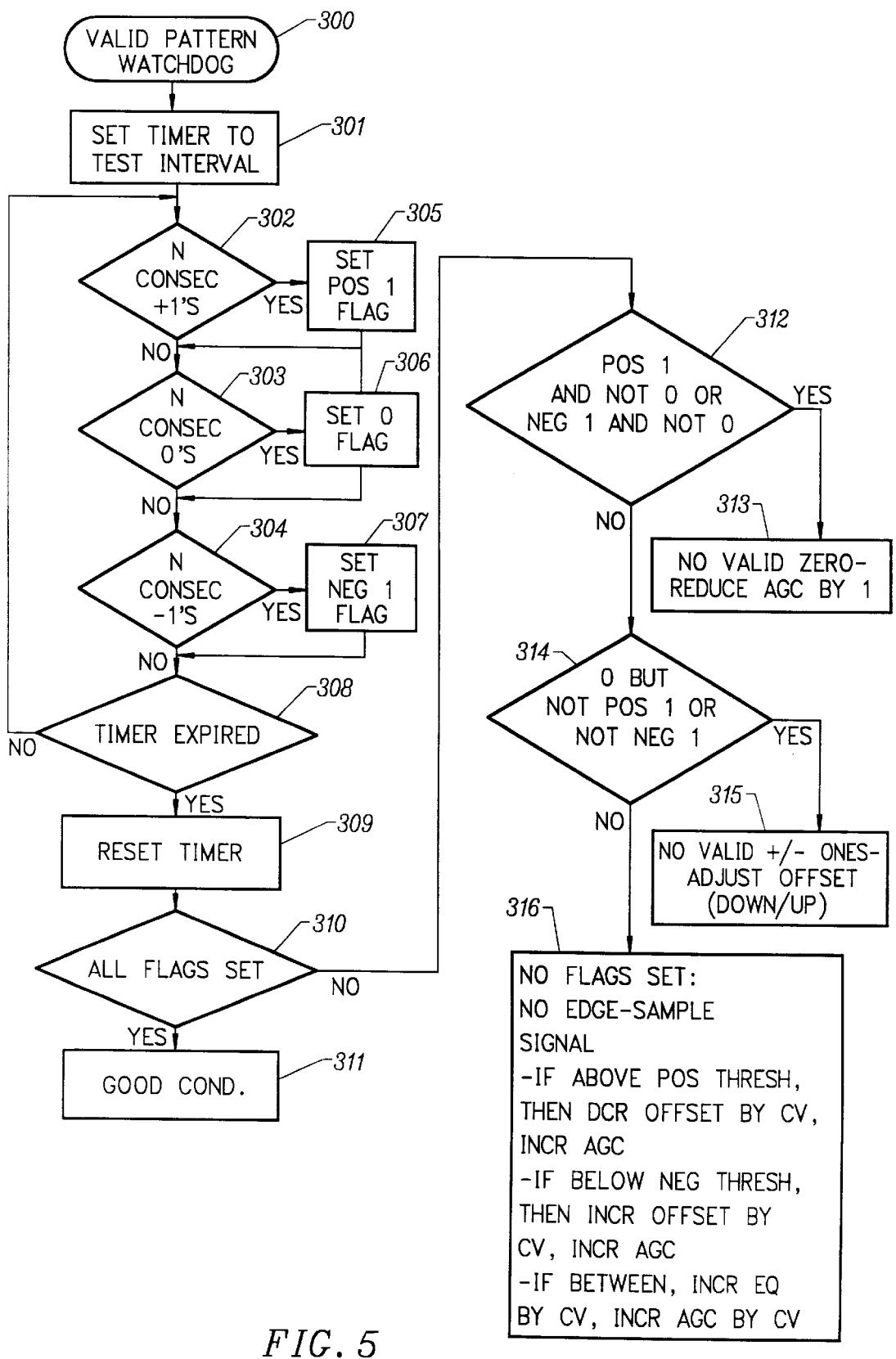
FIG. 5 is a flow chart of the valid pattern watchdog detector function for the tuner of the present invention.

FIG. 5 illustrates the process executed by the valid pattern watchdog for this example beginning at block 300. First the algorithm begins by setting the timer to the test interval (block 301). The process then monitors for a number N of consecutive values, such as consecutive +1's at block 302, consecutive 0's at block 303, or consecutive −1's at block 304. After detection of consecutive +1's a +1 flag is set at block 305. After detection of consecutive 0's, a 0 flag is set at block 306. After detection of consecutive −1's, a −1 flag is set (block 307).

After monitoring for consecutive values, the process determines whether the timer is expired (block 308). If it has not expired, the process continues monitoring. If the timer has expired, then the timer is reset (block 309) and the process begins to evaluate the flags set at steps 305–307.

The algorithm first determines whether all flags are set (block 310). If they are all set, then the channel is in good condition (block 311). If they are not all set, then the process determines whether the +1 flag is set but not the 0 flag, or the −1 flag is set but not the 0 flag (block 312). If this condition is detected, then there is no valid 0 detected, and the automatic gain control parameter is reduced by a small value such as 1 relative setting (block 313). If this condition is not detected, then the algorithm questions whether the 0 flag is set but not the +1 flag or not the −1 flag are set (block 314). If this condition is detected, then there are no valid ±1's. In this case the offset is adjusted down if there are no valid +1's, or up if there are no valid −1's (block 315). If this condition is not detected, then the condition is no flags are set as indicated at block 316. In this case, there is no edge being detected and a sample of the signal is made. If the signal is above the intermediate positive threshold, then the offset is decreased by a coarse value and the automatic gain control is increased slightly. If the value is below an intermediate negative threshold, then the offset is increased by a coarse value and the automatic gain control is incremented. If the signal sample is in between the intermediate negative and intermediate positive thresholds, then the equalizer is increased by the coarse value and the automatic gain control is increased by a coarse value.

Saturation Events

In the event that the AGC setting saturates at its maximum or minimum setting and the tuning algorithm requires more or less gain, respectively, the additional gain is provided by incrementing or decrementing, respectively, the equalizer parameter settings.

In the event that the offset saturates and the tuning algorithm requires more or less offset, the AGC parameter setting is incremented. If the offset saturates in either direction, then AGC parameter increases. In the event that the offset saturates, the AGC parameter is incremented to enable one of the other coarse tune events to happen or to ensure that both positive and negative ones occur.

Fine Tune Methods

In one embodiment, the fine tune methods operate by sampling a post equalizer MLT3 signal with comparators at V/2 and −V/2 volts and at +V, −V, and 0.0 volts, where V is 1.0 volts for example. This sampling method looks for three or more positive ones, zeros, or negative ones in a row. Samples are then taken on the first and second clocks after the output of the comparators switch. The optimum sampling window for the first sample is approximately 0 to 4 nS after the edge for a 125 MHz MLT3 signal. The second sample is taken 8 nS (one bit period) after the first sample. It looks for patterns that have run lengths greater than or equal to 3 bits. The third bit is important since it ensures that the second sample does not land on a switching edge.

Equalization fine tuning is based on the fact that for an under equalized waveform the transitions from 1 to 0 or −1 to 0 have an "over damped" quality. The transient edge is slow. The greater the degree of under equalization, the larger the settling time. Over equalized waveforms conversely tend to behave as 'under damped' signals with significant overshoot but negligible ringing. The first sample measures this overshoot or undershoot to tune the equalizer.

The second sample in the waveform is taken on the second clock edge, after the comparators switch, to allow the waveform time to settle. This sample is used to qualify the first equalization sample. The same applies for instances where the output of the comparators switch to +1 or −1. The second sample in this case is compared to the high positive or high negative references respectively, and is used to tune the AGC.

Offset can be tuned in two ways. A first method examines the second sample taken for valid zero patterns. It takes the second sample after the comparator switches to zero and a bit pattern at least three zeros long occurs. This second sample is compared to zero volts. Depending upon whether it is higher or lower, the offset is adjusted. A second method examines the second sample taken for data patterns of three or more consecutive ones or negative ones. If the second sample is higher than the high positive threshold (for ones) or higher than the high negative threshold (for negatives ones) on average, the offset is lowered. If the second sample is lower than the high positive threshold (for ones) or lower than the high negative threshold (for negatives ones) on average, the offset is raised.

The state machine looks for a series of three or more continuous ones, zeros or negative ones to indicate a valid data pattern. When a valid data pattern occurs, the samples are passed to a 25 MHz state machine. If the sample is a 1, 1, 1 or a −1, −, −1 data pattern, the signal one is asserted. For such samples the signal polarity indicates whether the data pattern was 1, 1, 1 or a −1, −1, −1. If the samples were taken on a 0, 0, 0 data pattern, signal one is deasserted. Polarity now tells whether the samples were taken after a 1 to 0 edge or a −1 to 0 edge. The signal invalid is asserted if the first sample failed to occur in the optimum 4 nS sampling window.

In one embodiment, information is exchanged between the 25 MHz and 125 MHz clock boundary by a handshake mechanism such that any transfer of information is followed by an acknowledgment. Once the 25 MHz state machine acknowledges that it received the sample, the process is restarted. Valid samples are ignored while the 125 MHz state machine is passing data to the 25 MHz state machine and waiting for an acknowledgment.

Figure 6:
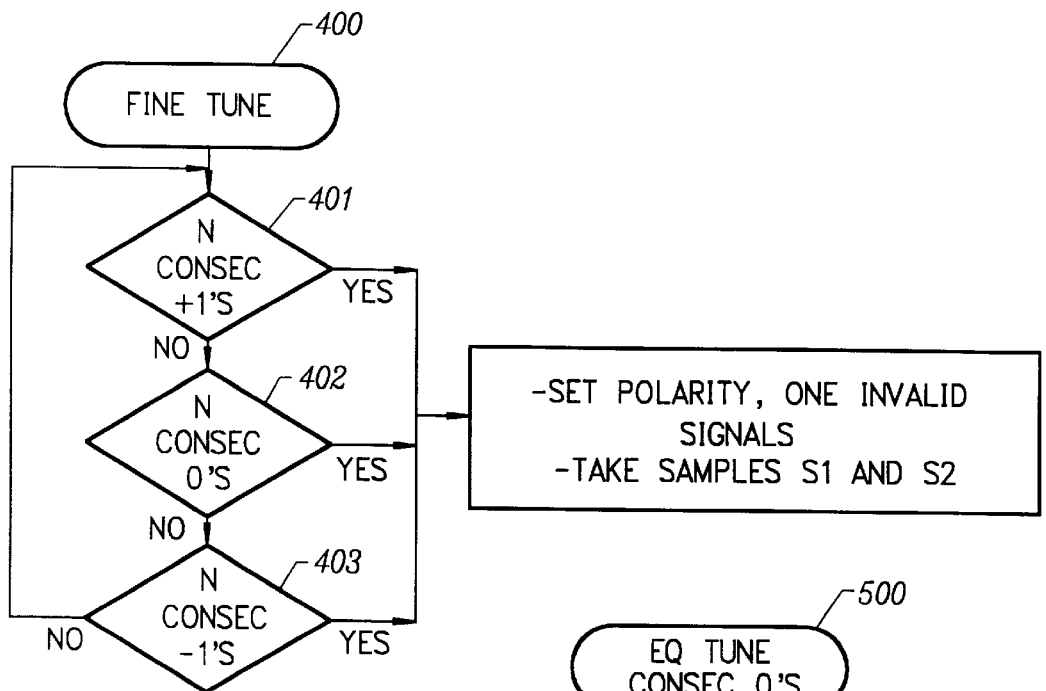
FIG. 6 illustrates the first portion of the fine tuning process according to the present invention.

FIG. 6 illustrates the monitoring of the fine tuning circuitry beginning at block 400. First the algorithm searches for one of a number of consecutive +1's 401, a number of consecutive 0's 402, and a number of consecutive −1's 403. If any one of these conditions is detected, then the polarity, the one, and invalid signals are set based on the previous samples. Also the samples S1 and S2 taken of the transition which proceeded the consecutive data values, are passed to the fine tuning mechanism.

Figure 7:
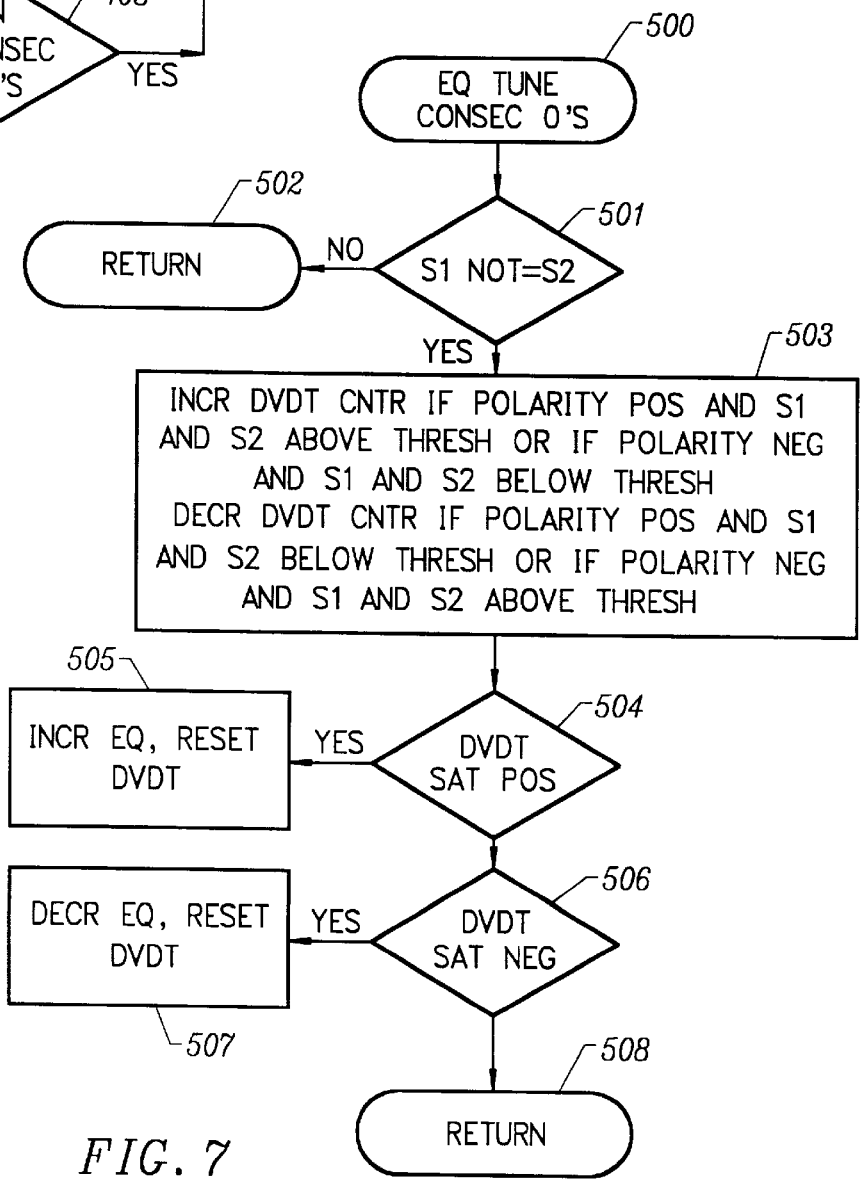
FIG. 7 is a flow chart illustrating the equalizer tuning for the fine tuning operation of the present invention.
Figure 8:
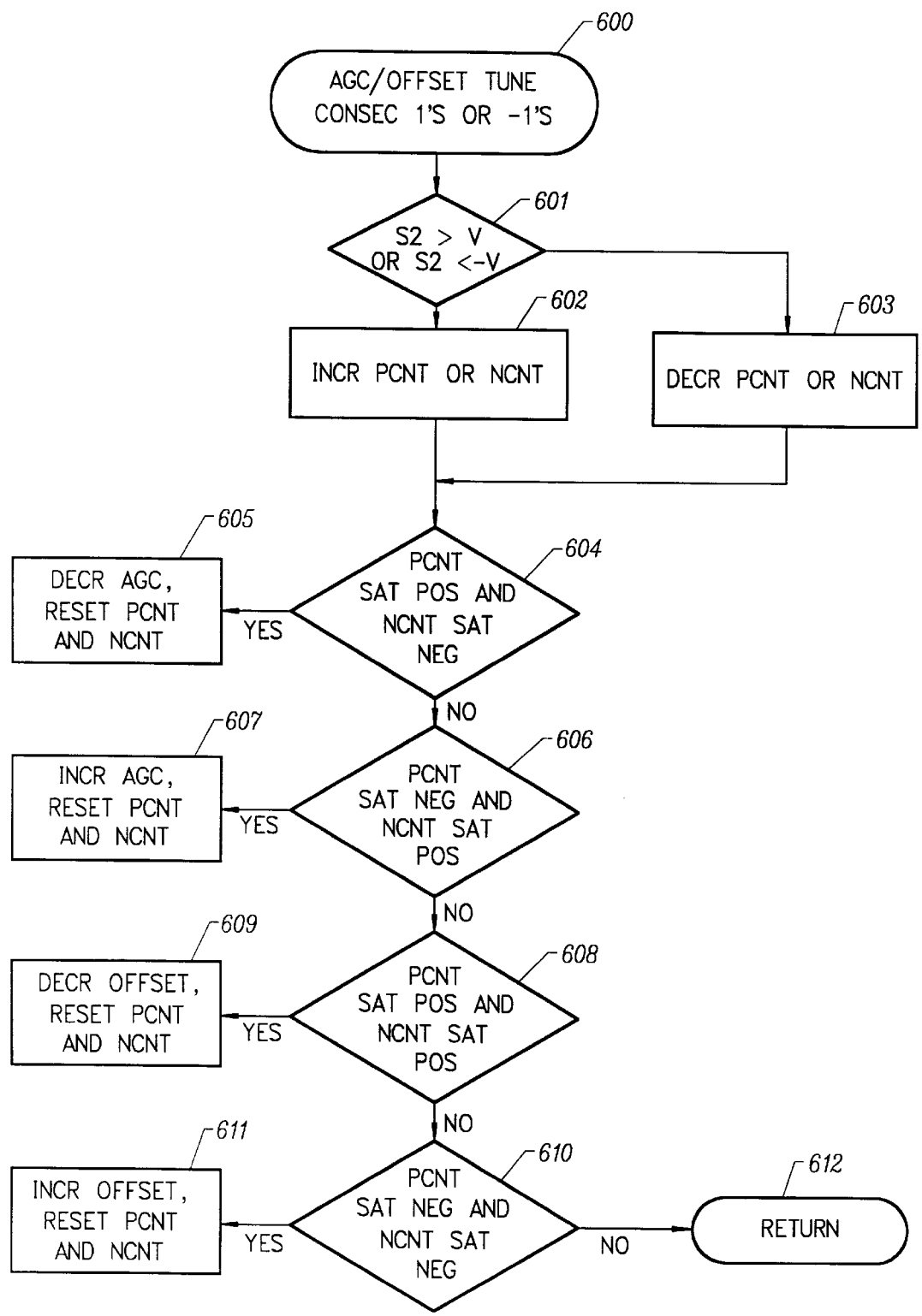
FIG. 8 illustrates the automatic gain control and offset tuning for the fine tuning process of the present invention.
Figure 9:
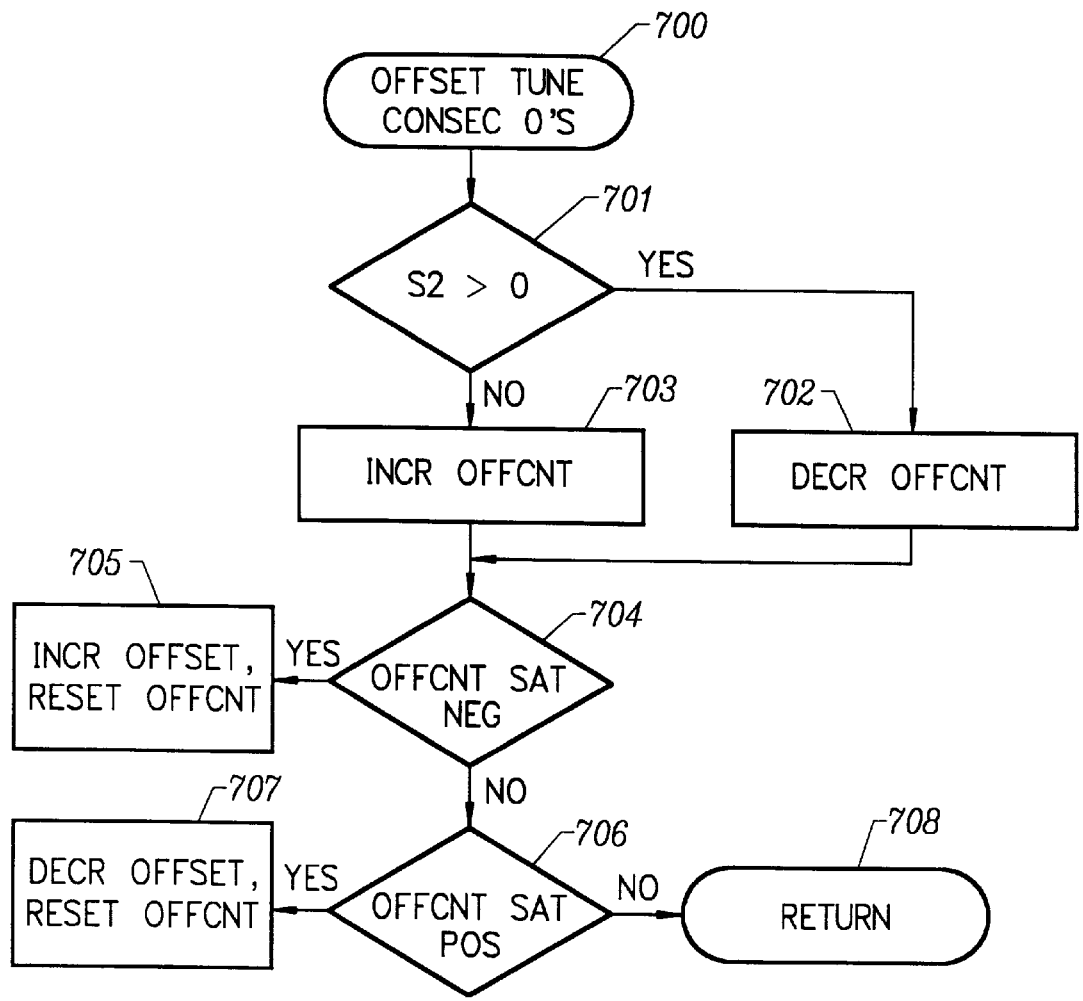
FIG. 9 illustrates an additional aspect of the offset tuning for the fine tuning process of the present invention.

FIGS. 7, 8 and 9 illustrate the fine tuning processes.

Equalizer Tuning

In one embodiment, equalizer tuning is based on samples taken at zero and upon the polarity of the previous one. The first sample is taken in the first four nanosecond window after a transition. The second sample is taken in the second bit time 8 nS later. The first sample is used to determine if the waveform is underdamped or overdamped. A counter is updated if both the first and second samples are equal. If the two samples are different, no updates are made. The counter increments if the polarity of the previous one was positive and the samples are both greater than the threshold voltage (0 volts for MLT3), or if the polarity of the previous one was negative and the samples were below the threshold, which indicates the signal is under equalized. The counter decrements if the polarity of the previous one was positive and the samples are both less than the threshold voltage, or if the polarity of the previous one was negative and both the samples were above the threshold, which indicates the signal is over equalized. If the counter saturates at plus or minus eight, the equalizer setting is incremented or decremented, respectively and the counter is reset to zero. The count of eight was a trade-off between quick response time, and adequate averaging over a number of samples.

FIG. 7 illustrates the equalizer tuning process for a detection of consecutive 0's beginning at block 500. The algorithm first determines whether S1 is not equal to S2 (block 501). Thus, if the signals are equal, then the process returns to continue monitoring (block 502). If they are not equal, then a counter DVDT counter is incremented if the polarity signal was positive, and S1 and S2 were above the high threshold, or if the polarity was negative and the samples S1 and S2 were below the high threshold. The counter DVDT is decreased the polarity is positive and S1 and S2 were below the intermediate threshold, or if the polarity was negative, and the signals S1 and S2 were above the high threshold (block 503). After adjusting the DVDT counter, the process determines whether the counter has saturated in a positive direction, such as by reaching +4 (block 504). If it has saturated, then the equalizer value is incremented and the counter is reset (block 505). If the DVDT counter saturated in the negative direction, such as by reaching −4 as indicated at the test at block 506, then the equalizer value is decremented (block 507) and the counter is reset. If the DVDT counter has not saturated in either direction, then the process returns (block 508).

AGC/Offset Tuning

In one embodiment, AGC fine tuning looks at samples taken at the high positive and negative reference (+1.0V and −1.0V). Plus and minus 1 are used in the following discussion for simplicity. The +1.0V samples are averaged in counter PCNT and the −1.0V samples are averaged in NCNT. For a 1, 1, 1 data pattern, if the second sample taken by the +1.0 comparator is greater than 1.0, PCNT increments, else it decrements. For a −1, −1, −1 data pattern, if the second sample taken by the −1.0V comparator is greater than −1.0V, NCNT increments, else it decrements. If both of these counters saturate at plus or minus four, the settings are updated. If PNCT goes to plus 4 and NCNT goes to minus 4, then AGC is decremented. If PCNT goes to minus 4 and NCNT goes to plus 4, then AGC is incremented and the counters are reset. The count of four provides quick response time and adequate averaging. This count is comparable to the EQ count since there are two counters here which must saturate.

In one embodiment, offset tuning occurs in one of two ways: based on ones, or based on zeros. Offset tuning based on ones is similar to AGC tuning. If both PCNT and NCNT saturate at four then the offset is decremented, if both saturate at negative four, then the offset is incremented. Offset tuning based on zeros checks the second sample taken by the comparator at 0 for a 0, 0, 0 data pattern. If this sample is above zero, a counter, OFFCNT, is incremented, else it is decremented. When OFFCNT saturates, the offset settings are updated and OFFCNT is reset.

FIG. 8 illustrates the fine AGC tuning and offset tuning for the condition of consecutive 1's or consecutive −1's beginning at block 600.

The process determines whether the second sample is greater than the high positive threshold, or less than a high negative threshold (block 601). If the sample is greater than the high threshold for a positive value or less than the negative threshold for a negative value, then the positive counter PCNT or negative counter NCNT are incremented (block 602). If the samples are not above their threshold for a positive value or below their threshold for a negative value, then the counters PCNT or NCNT are decremented respectively (block 603).

Next the algorithm determines whether one of four saturation conditions has occurred in the counters PCNT or NCNT. The first saturation condition is tested at block 604 to determine whether the PCNT counter has saturated at the positive maximum while the NCNT counter has saturated at the negative maximum. If this condition occurs, then the automatic gain control parameter is decremented and the PCNT and NCNT counters are reset (block 605). Next the algorithm detects whether the PCNT saturated at a negative maximum and the NCNT saturated at a positive maximum at block 606. If this condition is detected, then the automatic gain control is incremented and the counters are reset (block 607).

The next condition involves both counters saturating at the positive value as indicated at block 608. If this condition occurs, the offset value is decreased, and the counters are reset (block 609). The final condition detects whether both counters have saturated at the negative maximum (block 610). If this condition occurs, then the offset is increased and the counters are reset (block 611). If none of the four saturation conditions are detected, then the process returns to continue monitoring (block 612).

FIG. 9 illustrates the balance of the offset tuning which occurs upon detection of the consecutive 0 condition beginning at block 700. The process determines whether the sample S2 is greater than 0 at block 701. If it is greater than 0, then an offset counter OFFCNT is decreased (block 702). If the value is not greater than 0, then the counter OFFCNT is increased (block 703). Next, the process determines whether the counter OFFCNT has saturated at the negative extreme (block 704). If this condition occurs, then the offset value is increased and the counter is reset (block 705). Next the process determines whether the counter OFFCNT has saturated a positive direction (block 706). If this condition occurs, then the offset value is decreased and the counter is reset (block 707). If neither of the saturation conditions is detected, then the process returns to continue monitoring (block 708).

Figure 10:
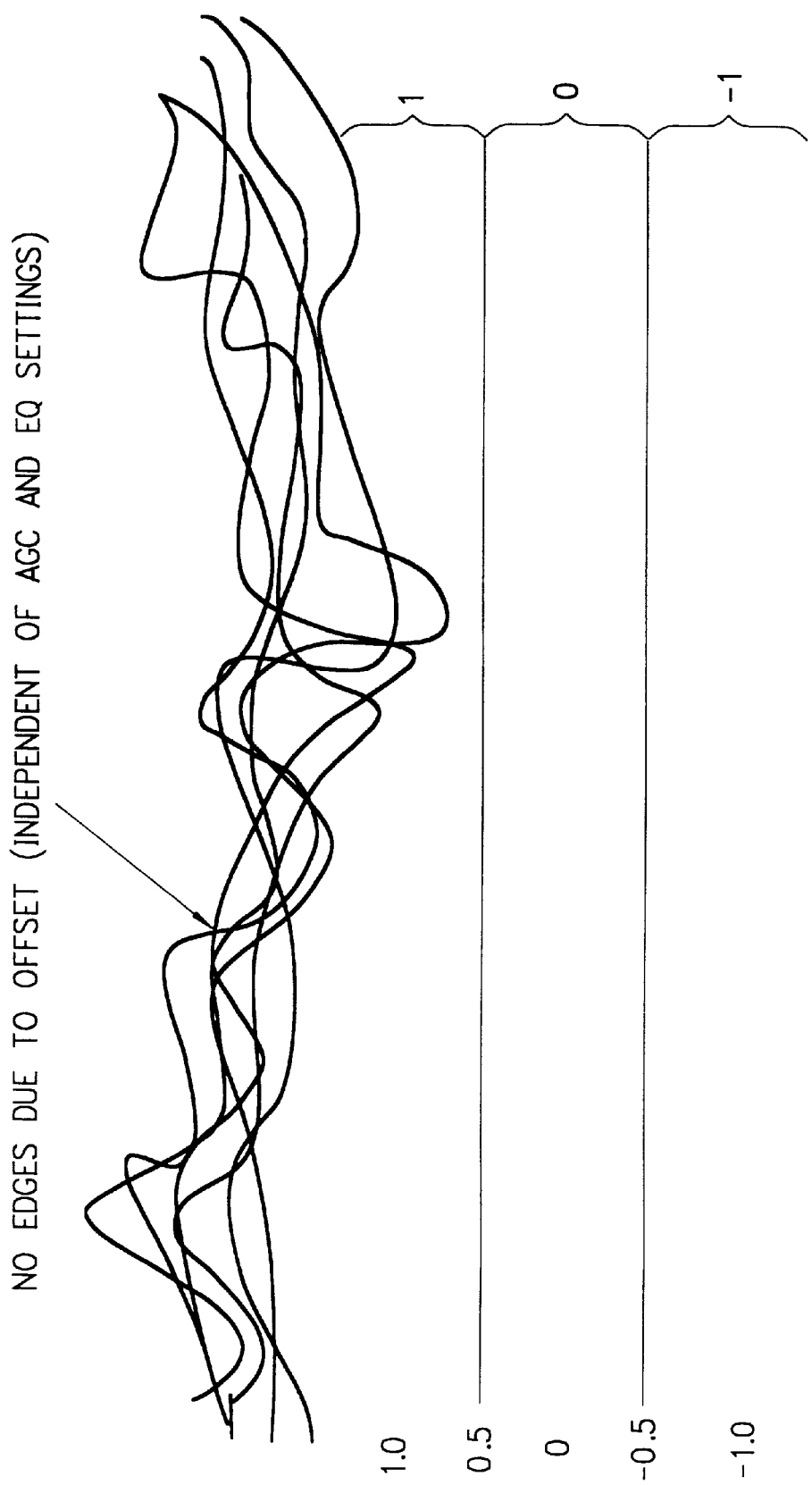
FIG. 10 is a graph illustrating the case of a high offset condition resulting in no edges in accordance with an aspect of the present invention.

FIGS. 10 through 15 illustrate a variety of tuning problems which arise during the equalization process in accordance with an aspect of the present invention. FIG. 10 illustrates the case of a high offset resulting in no edges. This condition is defined by the fact that no transitions are occurring at comparators set at the intermediate positive and negative thresholds (0.5, −0.5). The signal is one or negative one constantly. To remedy the situation, the tuner reduces the offset until transitions begin. Note that this condition is independent of equalizer or AGC settings.

Figure 11:
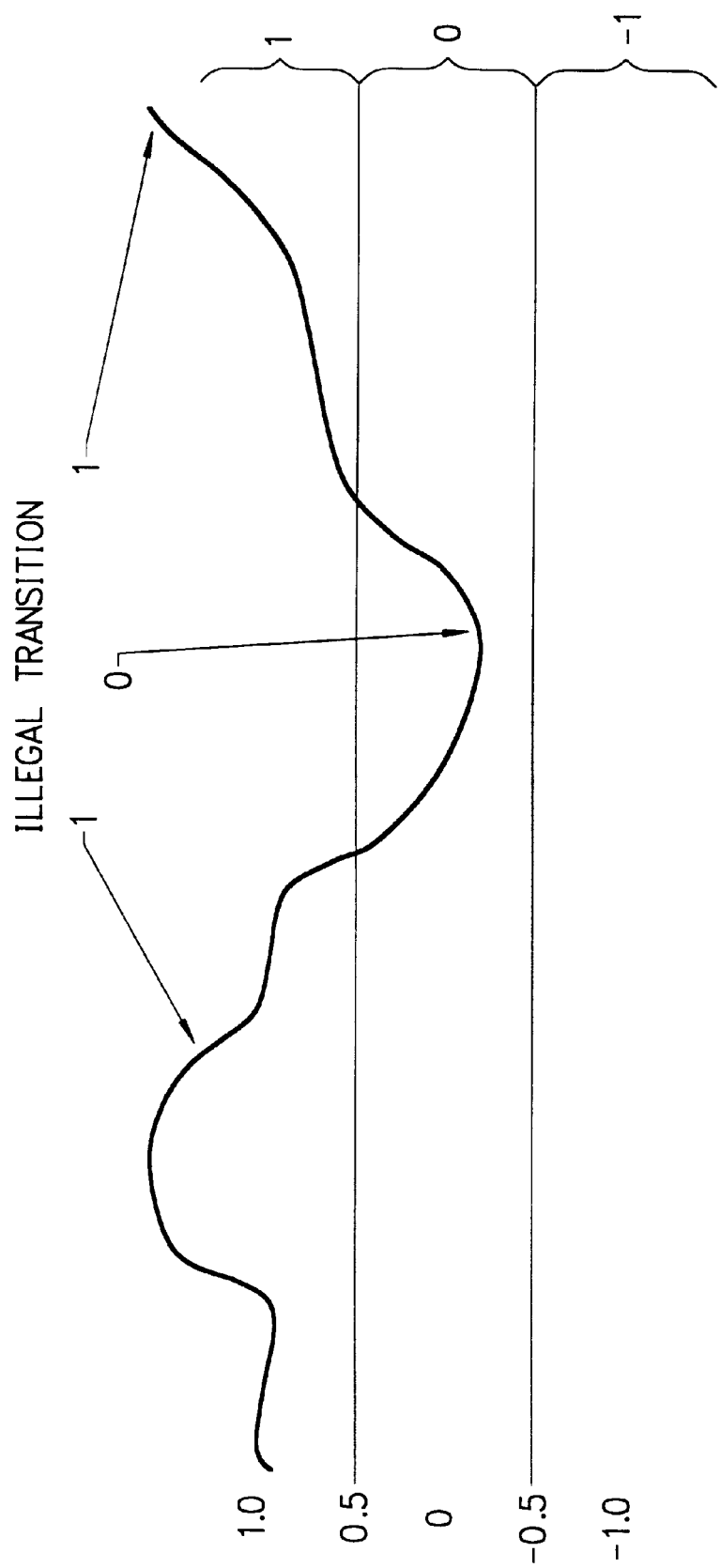
FIG. 11 is a graph illustrating the case of a high offset resulting in illegal transitions in accordance with an aspect of the present invention.

FIG. 11 illustrates a high offset condition resulting in illegal transitions in accordance with an aspect of the present invention. This condition is defined by transitions such as 1, 0, 1 OR −1, 0, −1. These transitions are invalid under MLT3, because MLT3 requires that the signal pass through zero while alternating between one and negative one. This condition is corrected by reducing the offset and optionally increasing AGC.

Figure 12:
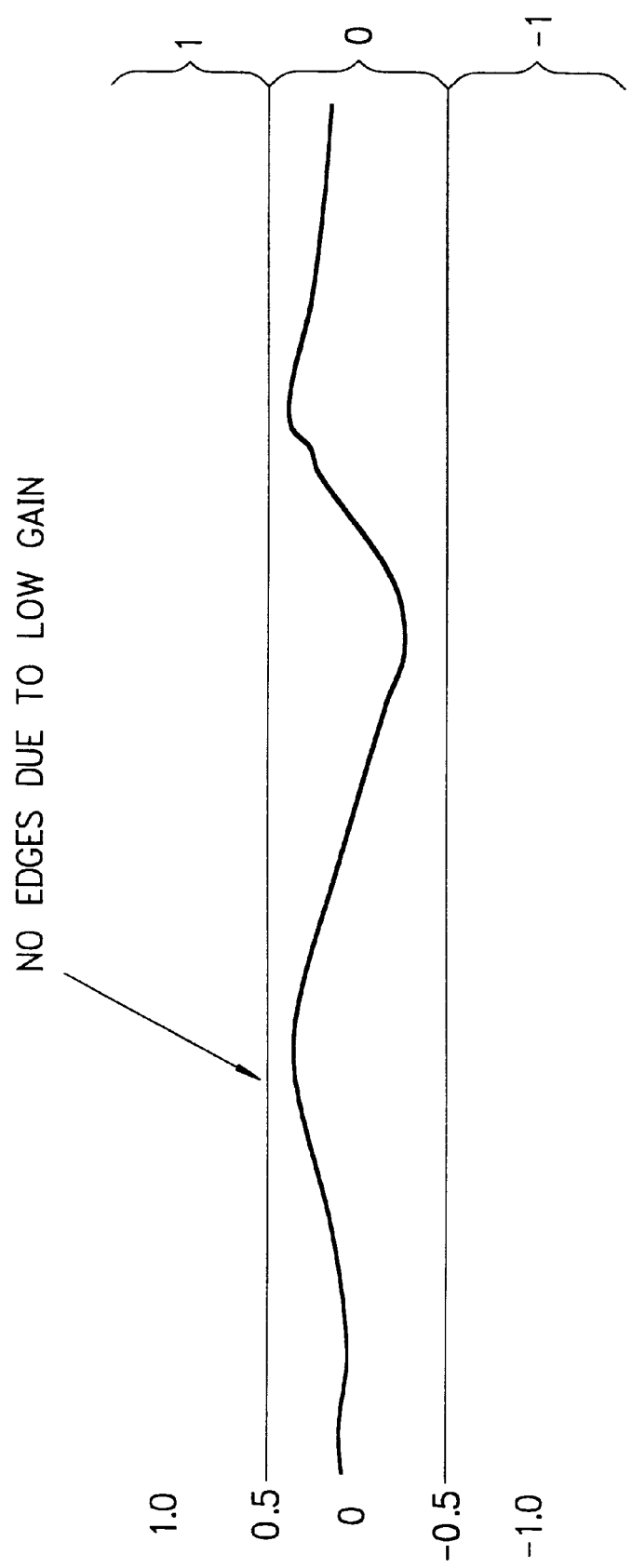
FIG. 12 is a graph illustrating the case of low AGC or low equalization resulting in no edges in accordance with an aspect of the present invention.

FIG. 12 illustrates the case of low AGC and/or low equalization resulting in no edges. Under this condition, no transitions occur and the signal is constantly at zero. To remedy this situation, the AGC and equalization are increased.

Figure 13:
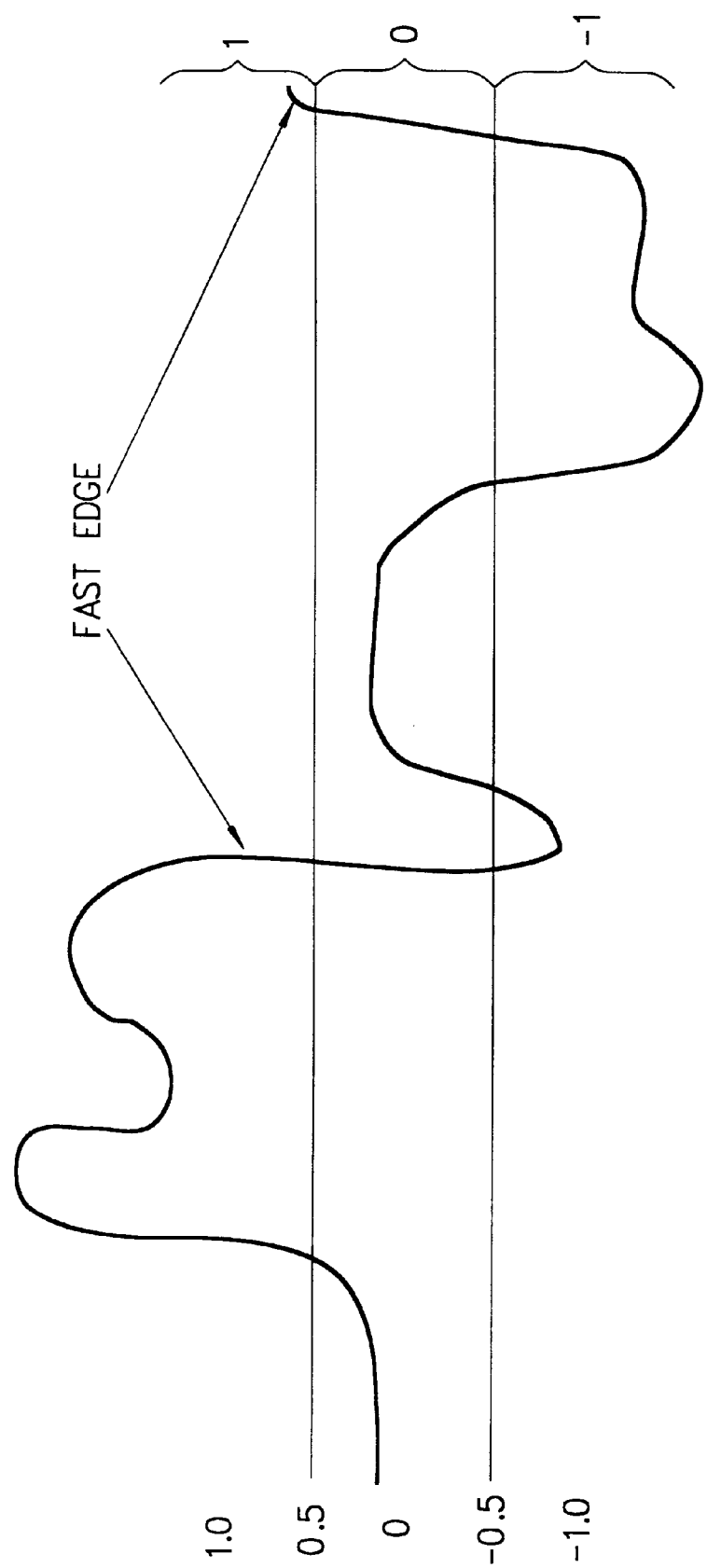
FIG. 13 is a graph illustrating the case of over equalization resulting in fast edges in accordance with an aspect of the present invention.

FIG. 13 illustrates the case of over equalization resulting in fast edges. This condition is defined by transitions from one to negative one and from negative one to one in less than four nanoseconds (half a bit period). This condition is remedied by reducing the equalizer setting.

Figure 14:
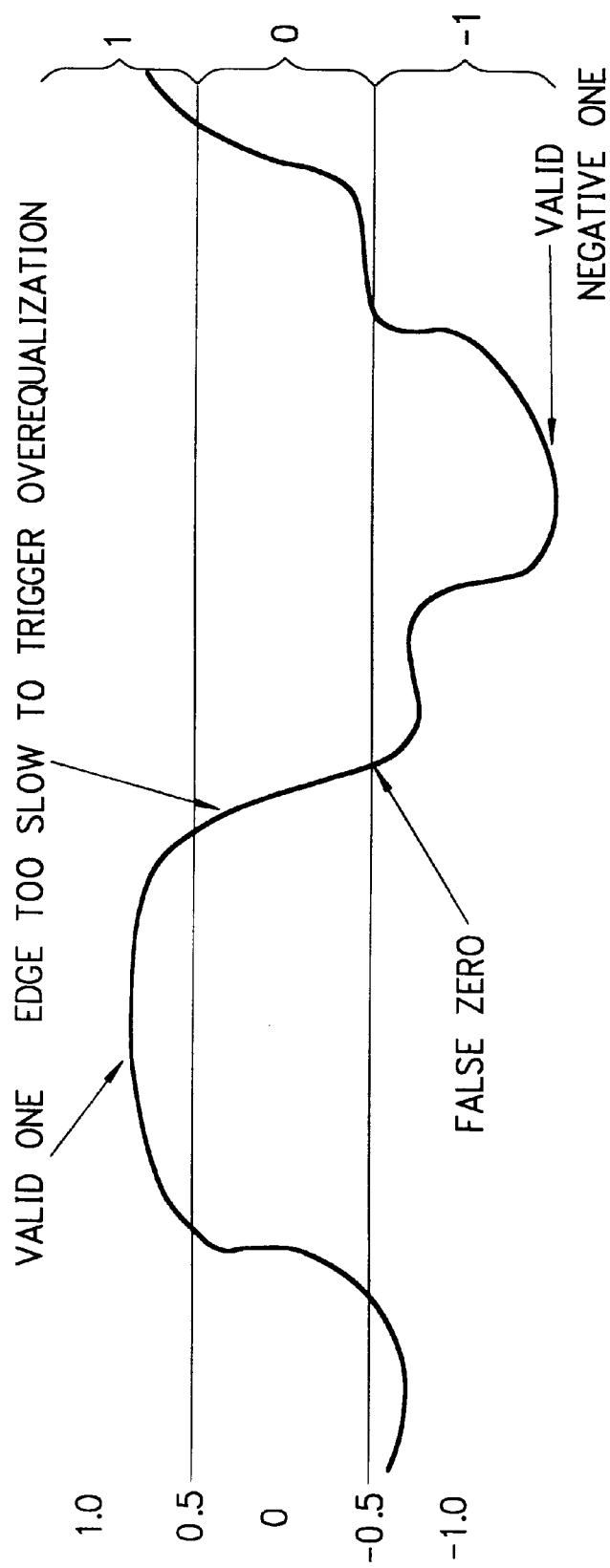
FIG. 14 is a graph illustrating the case of high negative offset and high AGC or high equalization resulting in zeros being detected as negative one in accordance with an aspect of the present invention.

FIG. 14 illustrates the case of a high offset and high AGC or equalization resulting in zeros being detected as ones. Under this condition, positive ones and negative ones are properly recorded. However, zeros are detected as positive or negative ones. The transitions from one to zero are too slow to be detected by the over equalization detector. Ultimately, the valid count will expire, resulting in a no-valid-zero condition. This results in the AGC being reduced.

Figure 15:
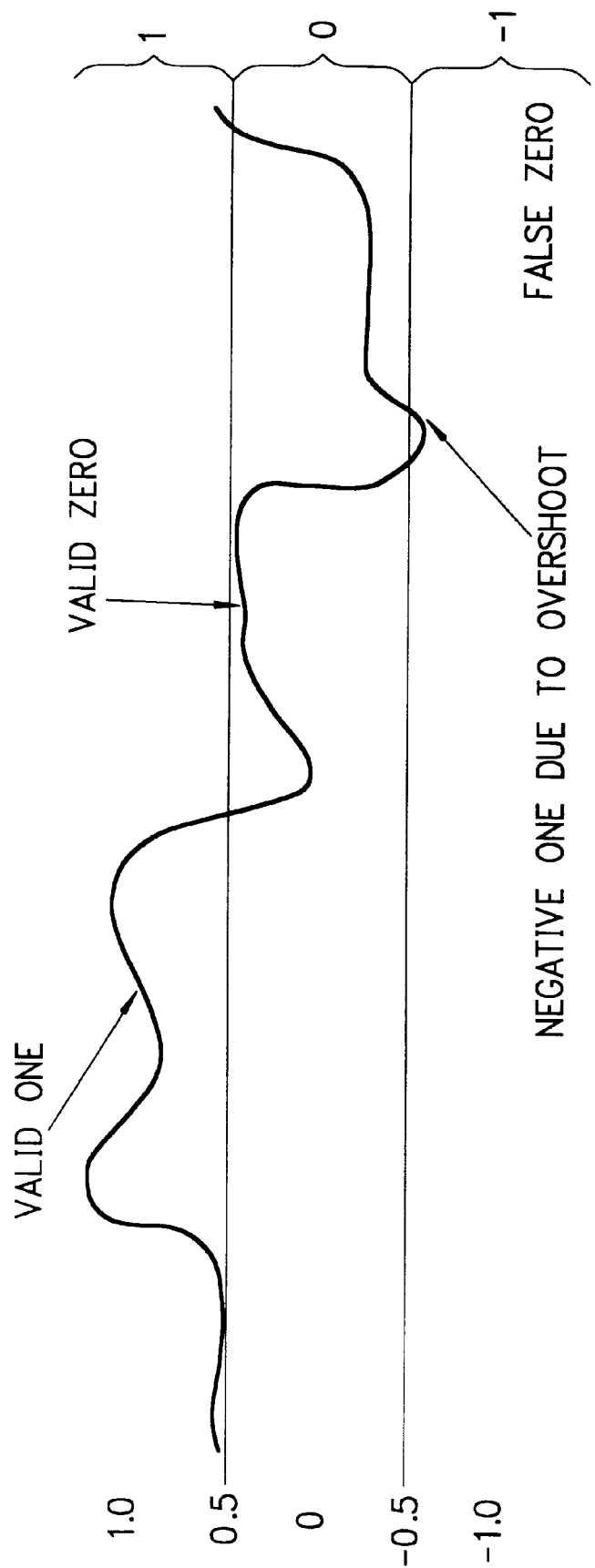
FIG. 15 is a graph illustrating the case of high offset and high equalization resulting in a one occurring only during overshoot followed by a false zero in accordance with an aspect of the present invention.

FIG. 15 illustrates the case of high offset and high equalization resulting in a one occurring only during overshoot followed by a false zero. Under this case, negative ones occur only during an overshoot in an over equalized waveform. This results in valid transitions, however fine tune does not get three negative ones in a row. Hence, the valid count will expire, with a no-valid-ones condition, and the offset will consequently be reduced.

In the claims that follow, the term "approximately" is used with certain voltages and times. The term "approximately" refers to a range in voltage or time around a specific value. For example, approximately zero volts may mean any voltage greater than −0.5 volts and lower than 0.5 volts in a tri-level voltage system that has voltage values of 1.0, 0 and −1.0 volts. The claims also use the terms "generally above" or "generally below." These terms mean that on average, or most of the time, a value is respectively above or below a specific value.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A method for adaptively equalizing a signal, comprising:

gathering a first sample after a first time interval following a transition in the signal;

gathering a second sample after a second time interval following the transition in the signal;

determining if the signal is overdamped from the first and second samples;

if the signal is overdamped, increasing an equalizer parameter;

determining if the signal is underdamped from the first and second samples; and if the signal is underdamped, decreasing the equalizer parameter.

2. The method of claim 1, wherein:

if the transition involves a decrease in voltage and the first and second samples are above a first threshold the signal is determined to be overdamped;

if the transition involves an increase in voltage and the first and second samples are below a second threshold the signal is determined to be overdamped;

if the transition involves a decrease in voltage and the first and second samples are below the first threshold the signal is determined to be underdamped; and if the transition involves an increase in voltage and the first and second samples are above the second threshold the signal is determined to be underdamped.

3. The method of claim 1, wherein the increasing of the equalizer parameter takes place after the signal is determined to be under equalized a plurality of times.

4. The method of claim 1, wherein the decreasing of the equalizer parameter takes place after the signal is determined to be over equalized a plurality of times.

5. The method of claim 1, wherein the first time interval is within one bit time after the transition.

6. The method of claim 1, wherein the second time interval is within two bit times after the transition.

7. The method of claim 1, wherein the signal includes an MT3 signal.

8. The method of claim 1, wherein the signal includes a binary NRZ signal.

9. The method of claim 1, wherein the signal is taken from the output of an equalizer.

10. The method of claim 1, wherein the transition is to a zero value, from one of a positive one value and a negative one value.

11. A method for adaptively equalizing a signal, comprising:

gathering a first sample after a first time interval following a transition in the signal;

gathering a second sample after a second time interval following the transition in the signal;

determining if the signal is under equalized from the first and second samples;

if the signal is under equalized, increasing an equalizer parameter;

determining if the signal is over equalized from the first and second samples; and if the signal is over equalized, decreasing the equalizer parameter.

12. A method for adaptively equalizing a signal, comprising:

gathering a plurality of samples a time interval after transitions in the signal;

decreasing an automatic gain parameter if samples in the plurality of samples gathered after transitions to a positive one value are generally above the positive one value, and samples in the plurality of samples gathered after transitions to a negative one value are generally below the negative on value; and increasing the automatic gain parameter if samples in the plurality of samples gathered after transitions to a positive one value are generally below the positive one value, and samples in the plurality of samples gathered after transitions to a negative one value are generally above the negative one value.

13. The method of claim 12, wherein samples gathered after transitions to a positive one value are generally above the positive one value if more samples are above than below the positive one value.

14. The method of claim 12, wherein samples gathered after transitions to a negative one value are generally below a negative one value if more samples are below than above the negative one value.

15. The method of claim 12, wherein samples gathered after transitions to a positive one value are generally below the positive one value if more samples are below than above the positive one value.

16. The method of claim 12, wherein samples gathered after transitions to a negative one value are generally above a negative one value if more samples are above than below the negative one value.

17. The method of claim 12, wherein the signal includes an MLT3 signal.

18. The method of claim 12, wherein the signal includes a binary NRZ signal.

19. The method of claim 12, wherein the signal is taken from the output of an equalizer.

20. A method for adaptively equalizing a signal, comprising:

gathering a plurality of samples a time interval after a plurality of transitions in the signal;

decreasing an offset parameter if samples in the plurality of samples gathered after transitions to a positive one value are generally above the positive one value, and samples in the plurality of samples gathered after transitions to a negative one value are generally above the negative on value; and increasing the offset parameter if samples in the plurality of samples gathered after transitions to a positive one value are generally below the positive one value, and samples in the plurality of samples gathered after transitions to a negative one value are generally below the negative on value.

21. The method of claim 20, wherein the signal includes an MLT3 signal.

22. The method of claim 20, wherein the signal includes a binary NRZ signal.

23. The method of claim 20, wherein the signal is taken from the output of an equalizer.

24. A method for adaptively equalizing a signal, comprising:

gathering a plurality of samples a time interval after a plurality of transitions in the signal;

decreasing an offset parameter if samples in the plurality of samples gathered after transitions to a zero value are generally above the zero value; and increasing the offset parameter if samples in the plurality of samples gathered after transitions to a zero value are generally below the zero value.

25. The method of claim 24, wherein the signal includes an MLT3 signal.

26. The method of claim 24, wherein the signal includes a binary NRZ signal.

* * * * *